INVENTORS
ROBERT M. BRICK
& JOHN D. GLOMB

BY
ATTORNEYS

June 21, 1966

R. M. BRICK ETAL 3,257,061

METHOD AND APPARATUS FOR SHAPE CONDITIONING
OF WELDED SHEET METAL TUBING

Filed Sept. 25, 1963

INVENTORS
ROBERT M. BRICK
& JOHN D. GLOMB

BY
ATTORNEYS

_United States Patent Office_ 3,257,061
Patented June 21, 1966

3,257,061
METHOD AND APPARATUS FOR SHAPE CONDITIONING OF WELDED SHEET METAL TUBING
Robert M. Brick, Hinsdale, and John D. Glomb, Dolton, Ill., assignors to Continental Can Company, Inc., New York, N.Y., a corporation of New York
Filed Sept. 25, 1963, Ser. No. 311,577
20 Claims. (Cl. 228—46)

This invention relates in general to new and useful improvements in the manufacture of cans through the formation of can bodies from a continuously welded tube, and more particularly relates to means for and the method of shape conditioning the welded tube immediately subsequent to the welding of a seam thereof to maintain the predetermined cross section thereof.

The art of producing cans from welded sheet metal tubing by most or all of the various seam welding techniques known at present involves starting with a flat sheet metal strip whose width approximates the circumference of the tubing to be produced. This tubing is shaped elastically into a tubular shape by any of a plurality of different methods, all of which result in the bringing of the two edges of the strip into slightly overlapped relation at a welding station where a longitudinally welded seam is formed. The critical element of all of these shaping methods, in so far as this invention is concerned, is that the strip is elastically shaped or formed into the tubular shape. This means that if, subsequent to welding, the metal of the tub were cut along the welded seam, the metal of the tube would go back towards a flat shape with the residual curvature depending upon the yield strength of the metal, the gauge of the metal, and the diameter of the formed tubing. These factors determine the degree to which the stresses on the inner and outer surfaces exceed the elastic yield strength and result in some permanent deformation or related permanent curvature. Essentially though, the tinplated metal of the gauges conventionally utilized in can manufacture and for normal can diameters the elastic spring back is very large so that the final strip will show a curvature equivalent to several feet as opposed to the one to two inch radius of the welded tube.

In the welding of thin walled, sheet metal tubing, the edges of the tubing are heated to a welding temperature as they are being brought together, and the welding is accomplished by pressing or forging together the heated edges. In a preferred type of welding, the forging and heating is of such an extent that the overlapped edges of the strip are forged back to substantially single thickness. This type of welding results in an intimate metallurgical weld or bond along a diagonal interface extending from the interior to the exterior of the tube.

In a continuous welding process of the type set forth above, the welded tubing, as it exits from the forging roll station, will have metal in the weld zone at a high temperature, e.g. from 1500 degrees F. to 2000 degrees F. This high temperature may exist throughout the thickness of the metal of the tube along the seam and for a circumferential width of approximately ⅛ inch with the temperature sharply tapering down to room temperature in a circumferential direction over a relatively short length of perhaps ¼ to ½ inch on either side of the weld.

In a manner which will be discussed in more detail hereinafter the internal stresses in the metal of the tube due to its elastic shaping tend to return the tube to a flat condition and thereby apply a tending stress to the metal of the heat softened weld. Since the metal in the welded seam is easily bent, the internal elastic forces within the tube are sufficient to effect the bending of the heat softened metal to a sharper curvature which permits a transverse section of the tube adjacent to the hot metal to assume a greater radius as the metal on opposite sides of the weld tends to straighten out and effectively change shape in this direction. Considering a circular tube, since the diameter of the tube cannot effectively change to any degree, the varied bending of the tube in a transverse direction through the welded seam results in the cross section of the circular tube to change to a pear shape, i.e. the metal would bend in the relatively soft weld zone to a much smaller radius and the weld adjacent thereto will assume a much larger radius compared to the remainder of the tube.

It is obvious that the problem of the tendency of a circular cross sectional tube formed of light gauge sheet metal to assume a pear shape is greatest with thinner gauges of metal and with metal of high elastic yield strengths. The pear shape is very undesirable commercially for the production of cans since it makes it difficult or impossible to attach end closures at high speeds utilizing existing can closing equipment.

The problem of the distortion of the tube to have a pear shaped cross section has been solved in the past by directing an intense jet or jets of water on the weld metal immediately behind the forge rolls. The use of this water as a coolant cools the weld metal within a couple of inches to a temperature below a red heat temperature. At this low temperature the weld metal has sufficient elastic strength to largely prevent the development of the undesirable pear shape. Unfortunately, this quenching of steel has an adverse metallurgical effect in that it substantially hardens the metal in and immediately adjacent to the weld, while at a little greater distance, the welding heat is sufficient only to soften the base metal since the temperature is insufficient to result in hardening. When such a structure is flanged, as a preliminary step for the securement of end closures thereto, the hardened metal will not stretch as required in the flanging operation, which stretching is generally six to eight percent of the periphery of the flange. Instead the stretch is taken by the metal immediately adjacent to the hardened metal and the substantially increased stretching in this immediate proximity results in fracturing.

In view of the foregoing problems resulting from the quenching of the hot metal of the welded seam, it has been found necessary to cool the metal of the welded seam slowly at least from the welding temperature of 1500 degrees F. to 2000 degrees F. to a relatively low temperature, e.g. below 900 degrees F. at which temperature the metal has appreciable elastic strength and will not harden upon quenching.

In view of the foregoing, it is a primary object of this invention to provide means for holding a tube with a welded seam in its circular cross sectional shape while relatively slowly cooling the metal of the welded seam.

Another object of this invention is to provide a novel method of maintaining the cross section of a newly welded, thin walled sheet metal tube while the metal of the seam thereof is relatively slowly cooling, the method including the steps of confining the moving tube except for the vicinity of the welded seam, and inwardly pressing on the welded seam are to prevent buckling thereof.

Another object of this invention is to provide a novel method of maintaining the cross section of a thin walled, sheet metal tube while the metal of a welded seam thereof is relatively slowly cooling, the method including the steps of passing the major portion of the tube through a confining member which permits outward movement of the tube in areas remote from the welded seam, and passing the tube past a plurality of rollers which compressively engage the tube along the welded seam and compress the welded seam of the tube generally inwardly to prevent outward movement of the tube in the vicinity of the weld.

Another object of this invention is to cool the rollers of the foregoing object so as to increase the rate of cooling of the metal of the welded seam over that of cooling in gas but more slowly than cooling with a liquid such as water.

A further object of this invention is to provide a novel apparatus for receiving a thin walled, sheet metal welded tube immediately subsequent to the welding thereof and to maintain the cross section of the tube as the metal of the welded seam cools, the apparatus including an elongated confining member extending axially of the movement of the tube and being shaped to confine the tube against outward expansion about the periphery of the tube from sides opposite of the weld, and a plurality of pressure loaded rollers opposing the confining member for engagement with the welded seam to prevent the upward flowing or buckling of the tube out from within the confining member.

Another object of this invention is to incorporate the confining member of the foregoing object with endless belt means for effecting the movement of a tube through the confining member without scratching the tube and at the same time maintaining the close confinement required to maintain the cross section of the tube.

Another object of this invention is to provide a novel apparatus for maintaining the cross section of a thin walled, sheet metal tube having a welded seam during the cooling of the metal of the welded seam, the apparatus including a plurality of rollers disposed in a line and extending transversely of the line, the rollers being particularly adapted to engage and press inwardly the tube in the area of the welded seam to prevent the bending of the tube transversely across the welded seam due to internal elastic stresses within the tube and the fact that the welded seam is temporarily heat softened, the rollers being contoured in accordance with that portion of the cross section of the tube which is brought into engagement therewith, and the rollers being cooled in order to effect a more rapid cooling of the metal of the welded seam than from normal air cooling.

A still further object of this invention is to provide a novel apparatus which may be incorporated in existing welding lines without material changes therein, the apparatus being adapted to receive a tube immediately after the welding thereof and to exert pressures thereon in a manner to maintain the cross section of the tube despite the existence of internal stresses therein tending to distort the tube, and to aid in the cooling of the metal of the welded seam so that the internal stresses within the tube have no opportunity to distort the welded seam area of the tube while the metal of the tube is heat weakened.

With the above and other objects in view that will hereinafter appear, the nature of the invention will be more clearly understood by reference to the following detailed description, the appended claims and the several views illustrated in the accompanying drawings.

In the drawings:

FIGURE 6 is a schematic end view of a tube welded in accordance with this invention and shows the details of the weld thereof and the heat affected zone.

Figure 1:
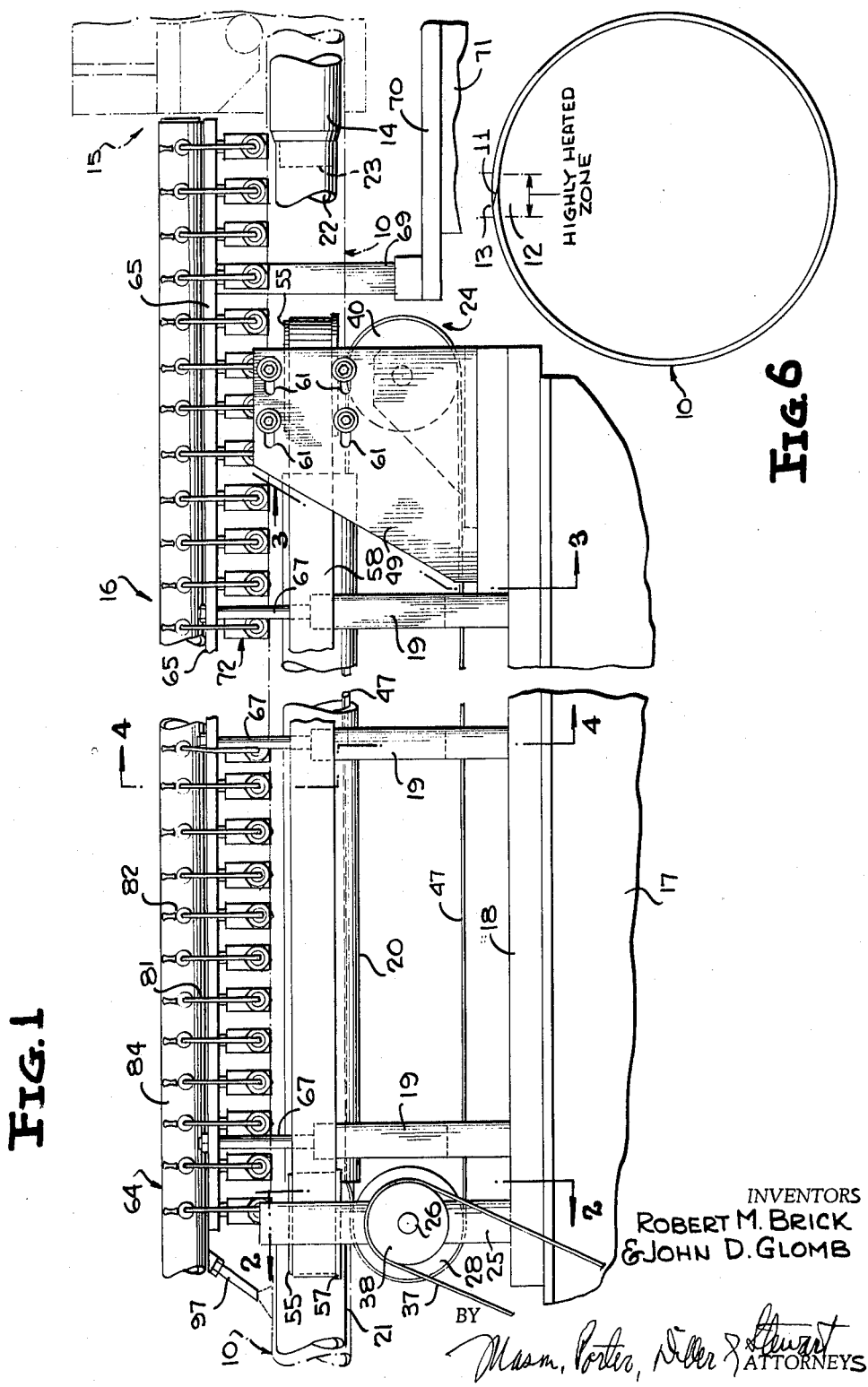
FIGURE 1 is a side elevational view of the apparatus of this invention and shows generally the details thereof and its association with a tube welding apparatus, an intermediate portion of the apparatus being broken away.

Referring now to the drawings in detail, reference is first made to FIGURE 6 wherein a circular cross sectional tube is schematically illustrated. It is to be understood that the thickness of the metal, the length of the weld and the width of the zone of high heat illustrated have been exaggerated. The tube is generally referred to by the numeral 10 and is illustrated as having a diagonal weld interface 11 and a high heat zone 12 which extends to both sides of the weld 11.

In a continuous strip welding process, as the welded tube exits from the forging weld station, the metal in the immediate weld zone is of a high temperature ranging from 1500 degrees F. to 2000 degrees F. This temperature will exist throughout the thickness of the tube and for a circumferential width of approximately ⅛ inch. The temperature sharply tapers down to room temperature in a circumferential direction over a relatively short length of perhaps ¼ inch on each side of the weld.

The metal in the weld zone, being of a very high temperature, has substantially zero elastic strength and therefore, will deform plastically under a very slight stress. Moving circumferentially from the weld zone, the metal reduces in temperature to essentially room temperature and exhibits its normal properties. For an average tube formed of conventional can body metal, it is postulated that the metal has an elastic strength of 45,000 p.s.i. at room temperature. However, if the metal were of a grade which is now coming into wide usage, the yield strength may be as high as 85,000 p.s.i. This value does not change the effect of the internal forces within the metal qualitatively, but only quantitatively, and makes the effects of the internal forces to be described worse.

Further considering a tube immediately after the welding of the seam thereof, at a position, for example 90 degrees from the weld zone, the tube has an elastic compressive stress in a tangential direction on the inner surface of 45,000 p.s.i. and a corresponding elastic tensile stress on the outer surface of 45,000 p.s.i. This stress exists around a major portion of the circumferential of the tube and necessarily drops to zero at the weld zone when the metal is highly heated immediately after the welding of the seam. It is, necessarily, a short circumferential portion of the tube on each side of the weld zone where the elastic stress gradually changes from zero to the 45,000 p.s.i. compressive stress and tensile stress. In other words, at perhaps some distance of ¼ inch to ½ inch on the weld zone the elastic stress on the inside and on the outside of the tube will be on the order of 5,000 p.s.i. and a little further away from the weld zone the elastic stress will be of a higher figure of perhaps 10,000 p.s.i., etc. These lower stresses, by the ordinary laws of mechanics, would correspond to much greater radii of curvature. Therefore, the portions of the tube adjacent to the hot metal of the weld will tend to assume greater radii which means essentially that these portions of the tube tend to straighten out and effectively change best in this direction. Since the diameter of the tube cannot effectively change to any degree, this means that the cross section of FIGURE 6 will change to a pear shape, i.e., the metal will bend in the relatively soft weld zone to a much smaller radius and the metal adjacent thereto will assume a much larger radius than the remainder of the tube. This invention is directed towards the retention of the original cross section of the tube as the highly heated metal in the vicinity of the weld slowly cools.

Referring now to FIGURE 1, it will be seen that there is shown in phantom lines at the right side of FIGURE 1 a welding apparatus generally referred to by the numeral 15. The welding apparatus 15 is in no way a part of this invention with the exception that it is specifically designed for forming the weld shown in FIGURE 6. During the heating and forge welding of the seam, which is generally referred to by the numeral 13, the tube 10 is shaped about a horn 14. In accordance with this invention, the tube 10, immediately after the welding of the seam 13, is delivered from the welding apparatus 15 to the shape conditioning apparatus of this invention, which shape conditioning apparatus is generally referred to by the numeral 16.

Figure 4:
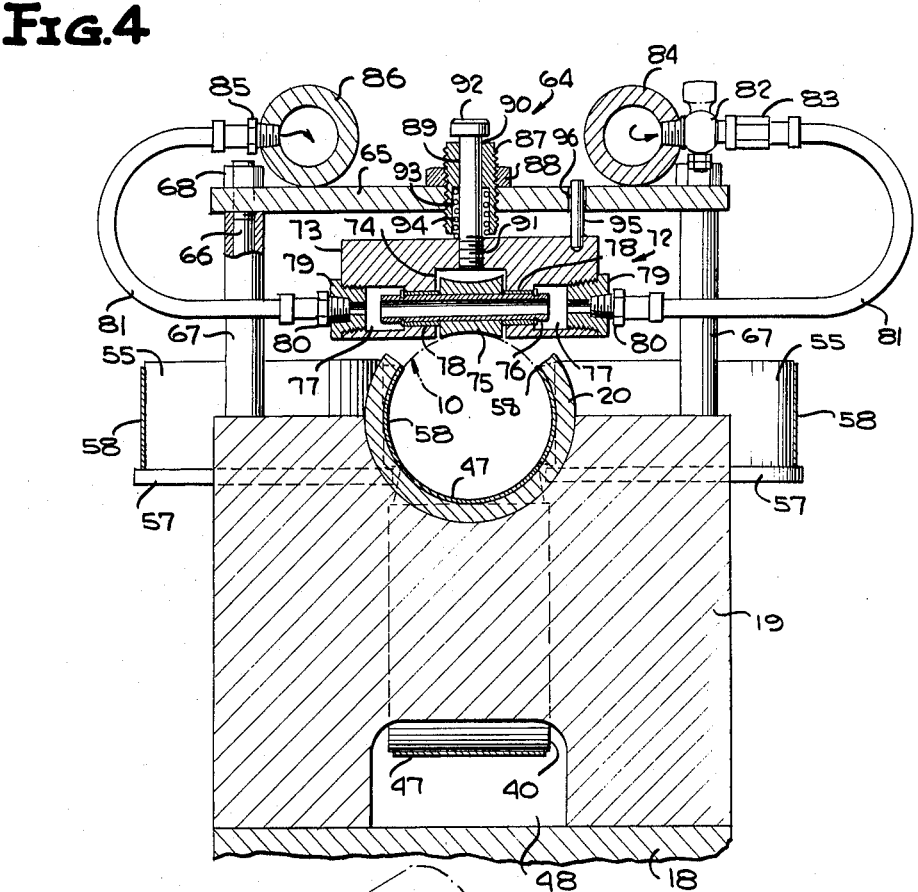
FIGURE 4 is an enlarged fragmentary transverse vertical sectional view taken along the line 4—4 of FIGURE 1 and shows in more complete detail the means for confining and maintaining the cross section of a welded tube in accordance with this invention.
Figure 5:
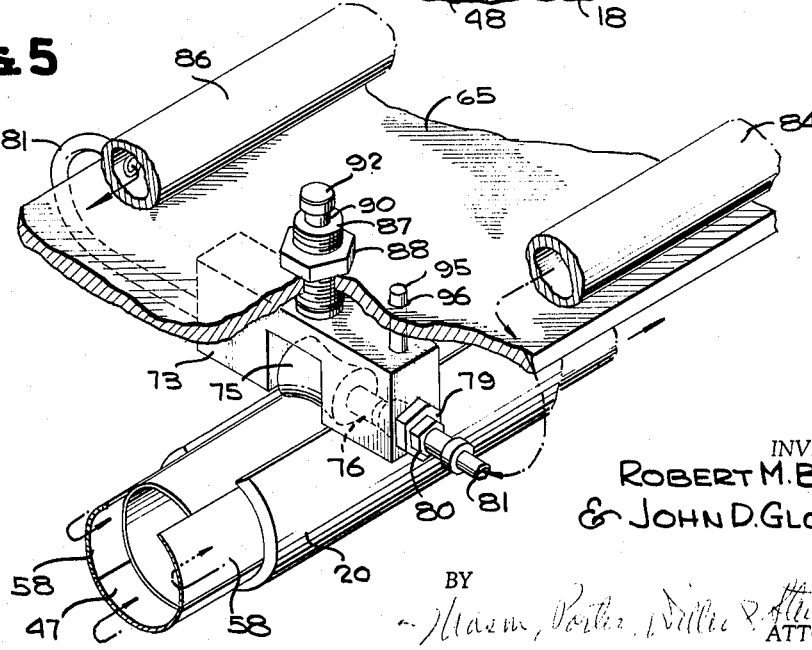
FIGURE 5 is an enlarged fragmentary perspective view showing additional details of the tube confining and cooling means.

The shape conditioning apparatus 16 includes a suitable support 17 on which there is mounted a base member 18. The base member 18 has a plurality of transverse support plates 19 extending upwardly therefrom. The support plates 19 serve to support a tube confining member 20, the cross section of which is best shown in FIGURE 4. The tube confining member 20 is in essence a length of heavy pipe which, when viewed in FIGURE 4, has approximately the upper quarter thereof removed.

At the exit end of the confining member 20 a horn section 21 is positioned, the horn section 21 being aligned with the horn 14. An intermediate horn section 22 has its right end, as viewed in FIGURE 1, telescoped over a reduced diameter end portion 23 of the horn 14 and the left end thereof telescoped over a like reduced portion of the horn section 21. In this manner the horn extends continuously through the confining member 20 and the horn section 21 is supported.

In order to facilitate the travel of the tube 10 through the confining member 20 and at the same time prevent marring of the exterior surface of the tube, the belt system, generally referred to by the numeral 24, is associated with the confining member 20. This belt system includes a supporting plate 25 which is relatively thick and extends upwardly from the base 18 adjacent the left end thereof. The belt system 24 includes a horizontally disposed drive shaft 26 which is suitably journalled within the supporting plate 25 by means of bearings 27. The drive shaft 26 carries a vertically disposed belt drum 28 which is seated in a vertical notch 29 in the support plate 25.

On each side of the notch 29 the supporting plate 25 is provided with a cutout 30. A vertical shaft 31 extends upwardly from each cutout 30 and is suitably journalled in the supporting plate 25 by means of bearings 32. Each vertical shaft 31 bridges a horizontal notch 33 in the supporting plate 25, which horizontal notch 33 intersects the vertical notch 29. The horizontal belt drum 34 is carried by each vertical shaft 31 and is positioned within one of the horizontal notches 33. Each vertical shaft 31 is driven from the drive shaft 26 by means of a bevel gear 35 on the drive shaft 26 meshed with a bevel gear 36 on the vertical shaft 31. The bevel gears 35 and 36 are disposed within the cutout 30.

The drive shaft 26 is driven from any suitable drive means in unison with the welding operation by means of a drive belt 37 which is entrained over a pulley 38 carried by the drive shaft 26. If desired, the belt and pulley arrangement may be replaced by a chain and sprocket arrangement.

Figure 3:
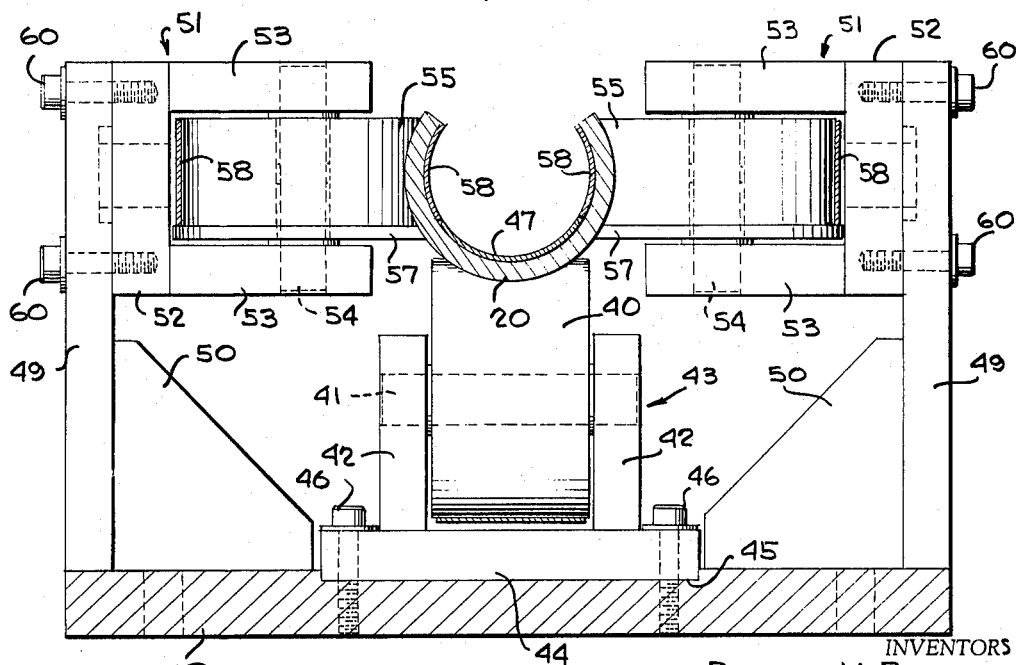
FIGURE 3 is an enlarged fragmentary transverse vertical sectional view somewhat similar to FIGURE 2 and taken along the line 3—3 of FIGURE 1, the view showing the supports for the opposite ends of the belts.

At the right end of the base 18, as viewed in FIGURE 1, there is disposed a second vertical belt drum 40 which is in alignment with the belt drum 28. The belt drum 40 is of the idler type, and as is best shown in FIGURE 3, is carried by a horizontal shaft 41 which extends between two upstanding plates 42 and a bracket, generally referred to by the numeral 43. The bracket 43 includes a base plate 44 to which the upstanding plate 42 is suitably secured, and the base plate 44 is releasably seated in a notch 45 on the upper surface of the base 18 by means of bolts 46.

An endless conveyor belt 47 is entrained over the belt drums 28 and 40. The endless belt 47 has the upper run thereof extending through the confining member 20 and providing a liner for the lower portion of the confining member 20. The lower run of the endless belt 47 passes freely through openings 48 formed in the lower portions of the support plates 19, as is best shown in FIGURE 4.

At the right hand end of the base 18, as viewed in FIGURE 1, there is a pair of longitudinally extending upstanding plates 49 which are braced by means of gussets 50. Each of the plates 49 carries a generally U-shaped bracket, generally referred to by the numeral 51. Each bracket 51 includes a base member 52 which is vertically disposed, and a pair of spaced plates 53, which are horizontally disposed and vertically spaced. An idler shaft 54 extends through each pair of plates 53 and has supported thereon a belt drum 55 which corresponds to a respective one of the belt drums 34. It is to be noted that the belt drums 34 and 55 are provided with lower flanges 56 and 57, respectively, so as to retain endless belts 58 thereon against downward slippage. Each endless belt 58 has an inner run which passes through the confining member 20 and lines side portions of the confining member 20. As is clearly shown in FIGURE 4, the associated runs of the endless belts 47 and 58 completely line the interior of the confining member 20 so as to prevent any accidental engagement of the tube 10 with the confining member 20.

Figure 2:
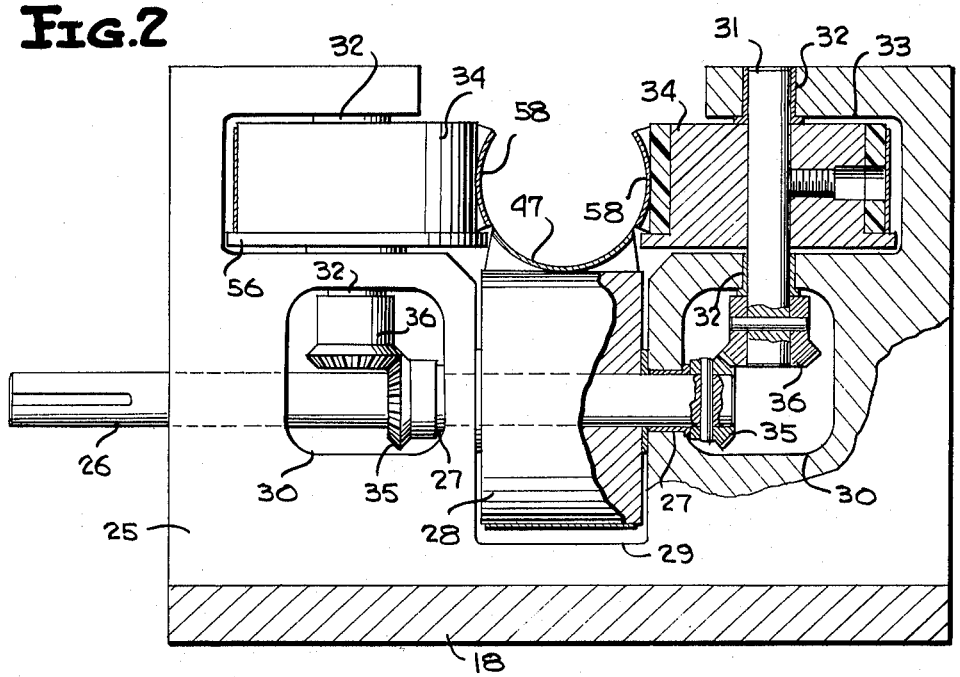
FIGURE 2 is an enlarged fragmentary transverse vertical sectional view taken along the line 2—2 of FIGURE 1 and shows the general details of guide means for tube transporting and shape retaining belts.

Referring once again to FIGURES 1 and 2, it will be seen that the brackets 51 are secured to the plates 49 by means of a plurality of bolts 60. Each of the bolts 60 passes through an elongated slot 61 (FIGURE 1) in its respective plate 49 so that the brackets 51 and the associated belt drums 55 may be longitudinally adjusted to maintain the desired tensioning of the endless belts 58. In like manner there is a slotted connection between the bolt 46 and the base plate 44 so that the brackets 43 may be longitudinally adjusted to longitudinally adjust the position of the belt drum 40 and thus control the tensioning of the endless belt 47.

It will be readily apparent that the endless belts 47 and 58 serve to protect the tube 10 as it passes through the confining member. In a like manner, it will be apparent that the endless belts 47 and 58 may be utilized for the purpose of driving the tube 10 or at least partially aiding in the driving of the tube 10. However, the invention is not so limited in that the tube 10 may be drawn by other types of tube pulling means which are disposed along the horn section 21 and not shown here. It is to be understood that the movement of the belts 47 and 58 must be synchronized with the movement of the tube 10.

A roll assembly, generally referred to by the numeral 64, overlies the confining member 20 and projects therebeyond towards the welding apparatus 15, as is best shown in FIGURE 1. The roll assembly 64 includes a horizontally disposed support plate 65 which is mounted on a plurality of rods 66 extending upwardly from the supporting plates 19. The rods 66 carry spacers 67 and are provided at their upper ends with nuts 68 threaded thereon. The plate 65 is further supported adjacent the welding mechanism 15 by means of an upright 69 which projects upwardly from a base member 70 which, in turn, is carried by a support 71.

A plurality of roll units, each generally referred to by the numeral 72, is suspended from the plate 65 in overlying relation to the confining member 20. Each roll unit 72 includes a support block 73 having a center downwardly opening recess 74 in which a contoured roll 75 is positioned. Each roll 75 is carried by a shaft 76 which is hollow and which has the opposite ends thereof opening into cavities 77. The shaft 76 is seated in suitable bushings 78 so as to effect the sealing of the cavities 77 while permitting fluid flow through the shaft 76. The relationship of the roll 75, the shaft 76 and the support block 73 is such that the roll 75 is free to rotate.

The outer end of each of the cavities 77 is closed by a fitting 79 which is threaded thereinto. A suitable pipe fitting 80 is threaded into each fitting 79 and has a pipe 81 extending therefrom. One of the pipes 81 is connected to a valve member 82 by means of a fitting 83, and the valve member 82 is, in turn, threaded into a coolant supply pipe 84. The other of the pipes 81 of each roll unit 72 is provided with a fitting 85 which is threaded into a coolant return pipe 86.

The support plate 65 is provided with a threaded fitting 87 for each of the roll units 72. The threaded fitting 87 passes through the support plate 65 and is adjustably positioned with respect to the support plate 65 by means of the threaded engagement therewith. A lock nut 88 is threaded on the upper part of the fitting 87 to maintain the same in an adjusted position. The fitting 87 has a bore 89 in which a shaft 90 is mounted for vertical reciprocatory movement. The lower end of the shaft 90 is threaded into the support block 73, as at 91, and the upper end of the shaft 90 is provided with a head 92 to limit the downward movement thereof through the fitting 87. The lower portion of the fitting 87 is provided with a cavity 93 in which there is disposed a coil spring 94 which is disposed around the lower portion of the shaft 90 and which reacts against both the fitting and the support block 73 to normally urge the associated roll unit 72 downwardly under pressure.

In order that the roll unit 72 may not rotate about the axis of the shaft 90, the support block 73 is provided adjacent one end thereof with an upstanding pin 95, and the pin 95 passes through a bore 96 in the support plate 65.

It will be readily apparent that as a tube 10 passes through the confining member 20, the welded seam area, which is disposed uppermost, will be engaged by the rolls 75. Since the rolls 75 are spring loaded downwardly and are contoured in accordance with the desired contour of the tube 10, it will be readily apparent that distortion of the tube 10 from, for example, its circular configuration, will be prevented. Furthermore, since the rolls 75 are cooled by passing a coolant, such as water therethrough, the engagement of the rolls 75 with the area of the weld seam of the tube 10 will result in the more rapid cooling of the welded seam than would normally result by passage of the welded seam through air or other gas at room temperature. The rolls 75 are preferably formed of copper because of the heat conductive properties of that metal. However, other metals could be utilized.

In a typical welding line for welding tubing having a diameter ranging between two and three inches, a roll 75 may have a diameter of ⅞ inch and be one inch in length. The rolls 75 are spaced on approximately one inch centers.

In order to prevent undesirable surface oxidation of the metal in the weld zone, it is not only desirable that the welding operation take place within an inert atmosphere but that the welded seam be maintained in such an inert atmosphere until the temperature of the welded metal has been reduced to approximately 400 degrees F. It is desired that the length of the shape conditioning chamber be held to a minimum and while the length of the shape conditioning chamber may be within suitable limits for relatively low speeds of operation, it has been found that the length of the shape conditioning chamber may be reduced as compared to that required for high speeds of operation by applying a quenching fluid to the metal of the welded seam after the metal has been reduced to a temperature in the vicinity of 800 degrees F. To this end, there has been illustrated in FIGURE 1 a coolant jet 97 which may be connected to the coolant supply pipe 84 at the left end of the roll assembly 64.

It is to be understood that various materials may be utilized in the construction of the shape conditioning apparatus 16, particularly those which come into engagement with the tube 10. However, it has been found that the endless belts 47 and 58 are preferably formed of a silicone-fiber composition and are only a few thousands of an inch thick so that they may readily conform to the shape of the confining member 20 without unduly exerting pressure on the tube 10.

It will be readily apparent that since the rolls 75, in combination with the confining member 20 and the belts 47 and 58 serve to confine the tube 10 and maintain the shape thereof until such time as the metal in the highly heated zone adjacent the welded seam has cooled to the point wherein it regains its strength, the shape of the welded tube may be maintained without the undesirable disadvantages of the previously utilized means for effecting such shape retaining operation.

Although only a preferred embodiment of the invention has been specifically illustrated and described herein, it is to be understood that minor variations may be made in the shape conditioning apparatus in accordance with the spirit and scope of this invention, as defined by the appended claims.

We claim:
1. A method of forming a thin walled sheet metal tube having a longitudinally welded seam wherein the tendency of the sheet metal to return to a generally flat normal state acts on the temporarily heat weakened metal of the welded seam and tends to distort the metal of the welded seam and thus the cross section of the tube; the improvement of maintaining the cross section of the tube during the initial cooling of the metal of the seam, said method comprising the steps of peripherally supporting the tube around the tube and spaced from the welded seam immediately subsequent to the welding of the seam, and pressing exteriorly on the tube along the heat weakened metal of the seam and inwardly in opposition to the normal direction of distortion of the tube when unrestrained until the metal of the seam has cooled sufficiently to resist the internal stresses of the tube.

2. A method of forming a thin walled sheet metal tube having a longitudinally welded seam wherein the tendency of the sheet metal to return to a generally flat normal state acts on the temporarily heat weakened metal of the welded seam and tends to distort the metal of the welded seam and thus the cross section of the tube; the improvement of maintaining the cross section of the tube during the initial cooling of the metal of the seam, said method comprising the steps of peripherally supporting the tube around the tube and spaced from the welded seam immediately subsequent to the welding of the seam, and simultaneously pressing exteriorly on the heat weakened metal of the tube along the seam and inwardly in opposition to the normal direction of distortion of the tube when unrestrained and cooling the metal of the welded seam until the metal of the seam has cooled sufficiently to resist the internal stresses of the tube.

3. The method of claim 1 wherein the pressing on the seam is contoured in accordance with the contour of the engaged portion of the tube.

4. The method of claim 1 wherein the pressing on the seam is contoured in accordance with the contour of the engaged portion of the tube, and heat is removed from the metal of the welded seam by cooling the means accomplishing the pressing.

5. In the forming of a thin walled sheet metal tube having a longitudinally welded seam and wherein the tendency of the sheet metal to return to a generally flat normal state acts on the temporarily heat weakened metal of the welded seam and tends to distort the metal of the welded seam and thus the cross section of the tube, a method of maintaining the cross section of the tube during the initial cooling of the metal of the seam, said method comprising the steps of immediately subsequent to the welding operation passing the tube through an elongated segmental peripheral rigidly mounted confining member in relative motion to said confining member and thus constraining the tube remote from the seam against outward distortion, and simultaneously passing the seam of the tube along a series of pressing rollers engaging the seam and pressing the seam area of the tube towards the interior of the tube to prevent distortion of the heat weakened metal of the seam, and continuing the confining of and pressing on the tube until the temperature of the metal of the seam has been reduced to a point where the metal of the seam has regained sufficient strength to resist internal bending stresses in the tube.

6. The method of claim 5 together with the step of cooling the rollers to effect a more rapid cooling of the metal of the welded seam than normal air cooling.

7. The method of claim 5 together with the steps of cooling the rollers to effect a more rapid cooling of the metal of the welded seam than normal air cooling, and then rapidly cooling the metal of the welded seam by the direct application of a coolant.

8. The method of claim 5 together with the step of supporting the tube within the confining member and aiding in free movement of the tube through the confining member.

9. An apparatus for shape conditioning a welded seam sheet metal tube, said apparatus comprising an elongated rigid support of a tubular construction and having an internal cross section of a contour adapted to snugly receive a tube therein, said support having a portion of its section omitted to define a longitudinally extending opening, means for rigidly mounting said support for receiving a continuously moving tube shortly after the welding of the seam thereof, said tube movement being relative to said support, and with said opening in alignment with the path of the tube seam, and a plurality of tube confining rollers aligned with and opposing said opening to retain a tube within said support.

10. The apparatus of claim 9 wherein said rollers are formed of heat conductive material, and means connected to said rollers for effecting the cooling thereof.

11. The apparatus of claim 9 wherein said rollers are formed of heat conductive material, and means connected to said rollers for effecting the cooling thereof, said support having a tube exit end, and means adjacent said tube exit end for directing coolant directly onto a welded tube seam.

12. The apparatus of claim 9 wherein each roller has a contour transversely of said support and in opposition to said support opening which is a continuation of the internal contour of said support.

13. The apparatus of claim 9 wherein each roller has an axis extending transversely of said support, and each roller is contoured for conforming to the contour of the seam area of a tube.

14. An apparatus for shape conditioning a welded seam sheet metal tube, said apparatus comprising an elongated rigid support of a tubular construction and having an internal cross section of a contour adapted to snugly receive a tube therein, said support having a portion of its section omitted to define a longitudinally extending opening, means for mounting said support for receiving a tube shortly after the welding of the seam thereof and with said opening in alignment with the path of the tube seam, at least one tube protecting belt passing through said support, said belt conforming to the internal contour of said support and being of the endless type, means for driving said belt at the same linear speed as a tube passing through said support, and a plurality of tube confining rollers aligned with and opposing said opening to retain a tube within said support.

15. The apparatus of claim 14 wherein said belt is formed of a thin flexible heat resistant material.

16. An apparatus for shape conditioning a welded seam sheet metal tube, said apparatus comprising an elongated rigid support of a tubular construction and having an internal cross section of a contour adapted to snugly receive a tube therein, said support having a portion of its section omitted to define a longitudinally extending opening, means for mounting said support for receiving a tube shortly after the welding of the seam thereof and with said opening in alignment with the path of the tube seam, a plurality of endless belts lying in planes generally radiating from said support, each of said belts having a run passing longitudinally through said support with said belt runs being in side-by-side relation and conforming to the internal contour of said support to provide a tube protecting lining for said support, means connected to said belts for driving said belts in unison and at the same linear speed as a tube passing through said support, and a plurality of tube confining rollers aligned with and opposing said opening to retain a tube within said support.

17. The apparatus of claim 9 wherein said rollers are resiliently mounted and constantly urged towards said support.

18. In combination with a device for continuously welding a seam of a longitudinally moving sheet metal tube, an apparatus for maintaining the shape of the tube as the highly heated metal of the tube seam cools, said apparatus comprising a longitudinally extending elongated fixed rigid support aligned with and disposed adjacent to said seam welding device, said support being of a tubular construction and having an internal cross section of a contour adapted to snugly receive, in continuous relative motion thereto, a welded seam tube passing from said seam welding device therein, said support having a portion of its section omitted to define a longitudinally extending opening, means mounting said support with said support opening being in alignment with the path of the tube seam, and a plurality of tube confining rollers aligned with and opposing said opening to retain a tube within said support.

19. The combination of claim 18 wherein said support has an entrance end spaced from said seam welding device, and certain of said rollers are disposed intermediate said seam welding device and said support.

20. The combination of claim 18 wherein said seam welding device includes a horn, and an extension of said horn extends through said support.

References Cited by the Examiner

UNITED STATES PATENTS

| | | | |
|---|---|---|---|
| 1,918,197 | 7/1933 | Sebell | 228—46 |
| 2,535,836 | 12/1950 | Cameron et al. | 219—64 |
| 2,792,799 | 5/1957 | Dahlstrom | 219—160 |

WHITMORE A. WILTZ, *Primary Examiner.*

M. L. FAIGUS, *Assistant Examiner.*